US010724884B2

(12) United States Patent
Peters et al.

(10) Patent No.: US 10,724,884 B2
(45) Date of Patent: Jul. 28, 2020

(54) PIPETTE

(71) Applicant: Harro Hoefliger Verpackungsmaschinen GmbH, Allmersbach im Tal (DE)

(72) Inventors: Heinrich Peters, Allmersbach im Tal (DE); Philipp Gaus, Allmersbach im Tal (DE); Marcus Hild, Allmersbach im Tal (DE); Julia Sturm, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 186 days.

(21) Appl. No.: 16/056,232

(22) Filed: Aug. 6, 2018

(65) Prior Publication Data

US 2018/0340809 A1 Nov. 29, 2018

Related U.S. Application Data

(63) Continuation of application No. PCT/EP2016/000205, filed on Feb. 6, 2016.

(51) Int. Cl.

*G01F 11/00* (2006.01)
*A61J 3/07* (2006.01)

(Continued)

(52) U.S. Cl.

CPC ............. *G01F 11/003* (2013.01); *A61J 3/074* (2013.01); *B01L 3/0217* (2013.01); *B65B 37/20* (2013.01); *G01F 11/027* (2013.01); *B65B 1/38* (2013.01)

(58) Field of Classification Search

CPC ...... G01F 11/003; G01F 11/027; G01F 11/24; A61J 3/074; B01L 3/0217

(Continued)

(56) References Cited

U.S. PATENT DOCUMENTS 4,542,835 A 9/1985 Gamberini
6,596,240 B2 * 7/2003 Taggart ................ B01L 3/0275 422/525

(Continued)

FOREIGN PATENT DOCUMENTS

CN 101120234 A 2/2008
CN 101501460 A 8/2009

(Continued)

OTHER PUBLICATIONS

English translation of description of FR2714465 from WIPO ip portal. worldwide.espacenet.com. acessed Apr. 16, 2020.*

*Primary Examiner* — Nimeshkumar D Patel
*Assistant Examiner* — Jean F Morello
(74) *Attorney, Agent, or Firm* — Walter Ottesen, P.A.

(57) ABSTRACT

A pipette for metering powder has a pipette sleeve and a metering piston having an end face for ejecting powder from the sleeve. The sleeve includes a free end and, on the sleeve inside, includes a circumferential wall extending in a closed manner around a longitudinal axis. The wall extends in the direction of the axis up to the free end and ends there in an edge which extends around the axis. The piston is guided to be movable parallel to the axis inside the wall. The end face, with the piston in a retracted metering position, defines a chamber with the wall. The wall is, in the region of the chamber, divided into a guide portion and a release portion adjoining the guide portion and extends up to the edge. The release portion surrounds a cross section of the chamber which is radially widened compared to the guide portion.

12 Claims, 4 Drawing Sheets

(51) Int. Cl.

| | |
|---|---|
| ***G01F 11/02*** | (2006.01) |
| ***B65B 37/20*** | (2006.01) |
| ***B01L 3/02*** | (2006.01) |
| ***B65B 1/38*** | (2006.01) |

(58) Field of Classification Search
USPC .......................................... 73/864.01, 864.11
See application file for complete search history.

(56) References Cited

U.S. PATENT DOCUMENTS

| | | | | |
|---|---|---|---|---|
| 7,237,699 | B2 | 7/2007 | Zill et al. | |
| 7,284,679 | B2 | 10/2007 | Zill et al. | |
| 7,770,761 | B2 | 8/2010 | Luechinger et al. | |
| 7,922,043 | B2 | 4/2011 | Luechinger | |
| 7,922,044 | B2 | 4/2011 | Luechinger | |
| 2005/0023297 | A1 | 2/2005 | Zill et al. | |
| 2006/0117869 | A1* | 6/2006 | Brinz | B01L 3/0217 73/862.046 |
| 2010/0193078 | A1 | 8/2010 | Bohler | |
| 2015/0342890 | A1* | 12/2015 | Penachio | A61K 9/4858 141/12 |
| 2016/0067704 | A1 | 3/2016 | Nitsch | |

FOREIGN PATENT DOCUMENTS

| | | | | |
|---|---|---|---|---|
| DE | 2050885 | A1 | 4/1971 | |
| DE | 3307135 | A1 | 10/1983 | |
| DE | 20309279 | U1 | 10/2004 | |
| DE | 20320604 | U1 | 12/2004 | |
| DE | 102013105454 | A1 | 12/2014 | |
| FR | 2714465 | A1 * | 6/1995 | B01L 3/02 |

* cited by examiner

PIPETTE

CROSS REFERENCE TO RELATED APPLICATIONS

This application is a continuation application of international patent application PCT/EP2016/000205, filed Feb. 6, 2016, designating the United States, and the entire content of the above application is incorporated herein by reference.

BACKGROUND OF THE INVENTION

Pharmaceutical preparations, food supplements or other powdery or granular substances are frequently provided in precisely measured consumer units. To this end, target containers such as hard gelatin capsules, blister packs or the like are filled with correspondingly measured quantities of powder. As a rule, in this case, volumetric metering of the individual portions is performed, the desired target weight being produced from the metering volume and a density distribution which is as reproducible as possible. Along with panel, roller or membrane metering, it is also possible to use so-called pipettes for such volumetric metering. Such pipettes include a pipette sleeve and a metering piston. On its inside, the pipette sleeve includes an inner circumferential wall which is closed about its longitudinal axis. The inner circumferential wall extends in the direction of the longitudinal axis up to the free end of the pipette sleeve and ends there in a pipette edge which extends around the longitudinal edge. The metering piston is guided displaceably parallel to the longitudinal axis inside the inner circumferential wall. In this case, the end face of the metering piston, in the retracted metering position thereof, defines a metering chamber together with the inner circumferential wall.

A powder bed is prepared for the metering operation. One or multiple pipettes are plunged into the powder bed from above. The respective metering piston is retracted relative to the pipette edge by such an amount that, in the metering position then assumed, it provides the desired volume of the metering chamber. During the plunging operation, the metering chamber is filled with the powder thereby realizing a powder pellet with the desired target volume. On account of the inherent static friction forces present, the powder pellet initially remains in the metering chamber and can be lifted out of the powder bed together with the pipette. The respective pipette is then positioned above an assigned target container. The powder pellet is then ejected via the metering piston and falls into the target container intended for it.

Observations have shown that the ejection operation of the powder pellet is not without problems. In particular, it could be observed that the powder pellet, initially positioned upright in the pipette, does not remain in the upright position when being ejected and falling down, but tends to tilt sideways. Such sideways tilting impairs the target accuracy of the falling powder pellet. It has to be ensured in an expensive and time-consuming manner that the powder pellet passes entirely into the target container without colliding with the edges of the container on account of its tilting movement. In particular in the case of target containers with small fill openings compared to the size of the powder pellet, as is the case with two-piece capsules, this can result in powder losses and consequently in a reduced yield of good capsules.

Furthermore, the use of pipettes in conjunction with 100% in-process control has proved to be difficult. The use of AMV sensors (Advanced Mass Verification) for capacitive measuring of the metered powder units has up to now only supplied insufficiently precise results.

SUMMARY OF THE INVENTION

It is an object of the invention to develop a pipette further in such a manner that it is possible to eject the powder pellet in a more precise manner.

The object can, for example, be achieved by a pipette for metering powder. The pipette includes: a pipette sleeve; a metering piston having an end face for ejecting the powder from the pipette sleeve; the pipette sleeve extending along a longitudinal axis; the pipette sleeve including a free end and defining a pipette sleeve inside; the pipette sleeve, on the pipette sleeve inside, including an inner circumferential wall which extends in a closed manner around the longitudinal axis; the inner circumferential wall extending in the direction of the longitudinal axis up to the free end of the pipette sleeve and ending there in a pipette edge which extends around the longitudinal axis; the metering piston being guided so as to be movable parallel to the longitudinal axis inside the inner circumferential wall; the end face, with the metering piston in a retracted metering position, defining a metering chamber together with the inner circumferential wall; the metering chamber defining a metering chamber region; the inner circumferential wall being, in the metering chamber region, divided into a guide portion and into a release portion which adjoins the guide portion and extends up to the pipette edge; the inner circumferential wall extending parallel to the longitudinal axis in the guide portion; and, wherein the release portion surrounds a cross section of the metering chamber which is radially widened compared to the guide portion.

According to an aspect of the invention, it is provided that in the region of the metering chamber, the inner circumferential wall is divided into a guide portion and into a release portion which adjoins the guide portion and extends up to the pipette edge. In this case, the inner circumferential wall extends parallel to the longitudinal axis in the guide portion, whereas the release portion surrounds a cross section of the metering chamber which is radially widened compared to the guide portion.

The disclosure is based initially on the knowledge that in the case of conventional pipettes according to the prior art, which include cylindrically formed metering chambers, the powder pellet is initially ejected in an axial-parallel manner as intended. At the last moment, however, when the metering piston is close to reaching the pipette edge and the powder pellet is freed from the pipette sleeve, the powder pellet experiences a tilting moment and a resultant tilting movement. It is possible to identify various causes for the realization of such a tilting moment. A first cause can be an irregular density distribution of the powder pellet as the forces which act on the powder pellet during pressing or compressing are possibly not composed homogeneously. On account of such a non-homogenous density distribution, during ejection, one side with a comparatively low density can yield just before the power pellet is removed from the pipette sleeve. This results in the powder pellet on the corresponding side being removed from the sleeve earlier. One-sided interactions occur between the powder pellet and the pipette sleeve, which lead to the observed tilting operation. Further causes can lie in the geometric asymmetries of the pipette which result, for example, from a necessary radial clearance which is present between metering piston and pipette sleeve. Production tolerances such as the axial run-out tolerance of the plunger end face naturally also come into consideration as a cause.

According to an aspect of the invention, however, these hardly avoidable imperfections are not to be primarily addressed. Rather, the combination according to the disclosure of a guide portion and a release portion of the inner circumferential wall is used to solve the underlying problem. During the ejection operation, the widened cross section of the release portion results in the powder pellet not being freed from the pipette sleeve in a sudden manner but slowly, while during the detaching operation, it is still guided in part, but to a diminishing extent during its inherently present elastic recovery. Therefore, a continuous, slow detaching operation occurs, which is why a powder pellet does not experience any jerkily releasing forces. Tilting moments, as have been observed in the prior art, are excluded or are reduced to such a small amount that the powder pellet does not carry out any tilting movement or any technically meaningful tilting movement when ejecting and falling into the target container. As a result, the falling powder pellet falls precisely onto the target site such that even target containers with a comparatively small opening are able to be filled reliably and without any particular precautionary measures. In addition, it has been shown that a powder pellet that has been positionally stabilized in such a manner is able to be subjected in a much better manner to AMV control measuring. As the powder pellet maintains the position of its longitudinal axis in a substantial manner while it falls through the capacitive measuring section of an AMV sensor, the assigned AMV measurement result is also correspondingly precise and reproducible. 100% in-process control has become readily possible in this way.

Various construction forms come into consideration according to the disclosure for the more precise configuration of the release portion. In an advantageous embodiment, the release portion and the guide portion surround the same cross section at their common boundary, the cross section surrounded by the release portion continuously increasing in size proceeding from the boundary toward the pipette edge. In particular, an embodiment comes into consideration for this where, when viewed in the longitudinal section of the pipette sleeve, the release portion extends in a linear manner proceeding from the boundary toward the pipette edge. An associated half angle is advantageously within a range of between 0.5° and 5.0°, in a preferred manner within a range of between 1.0° and 2.0° and is in particular at least approximately 1.5°. As an alternative to this, it can be expedient for the release portion, when viewed in the longitudinal section, to extend curved in a convex manner proceeding from the boundary toward the pipette edge and to merge, in particular, tangentially into the guide portion at the boundary. A further possible advantageous embodiment consists in that the cross section which is surrounded by the release portion increases in size rapidly at the boundary relative to the cross section surrounded by the guide portion thereby realizing a circumferential step. At any rate, tilt-free release of the powder pellet is ensured as a result.

The metering piston includes a guide surface which extends in the circumferential direction and has an axial height. In a further embodiment, with the metering piston in the retracted metering position, the guide portion of the circumferential wall surrounds the named guide surface along its entire axial height. In the retracted metering position, the metering piston does not therefore protrude with its end face into the widened release portion. Correspondingly, neither is there any excessively large gap between the guide surface of the piston and the circumferential wall of the metering sleeve, which benefits the realization of a geometrically precisely defined powder pellet and consequently the metering accuracy just as much as the desired capability of a gradual and not rapid release from the pipette.

The guide portion includes a guide length which is measured in the direction of the longitudinal axis. In a further embodiment, the guide length is greater than the axial height of the guide surface of the metering piston. In other words, this means that, in its retracted metering position, the metering piston leaves part of the guide portion of the inner circumferential wall free to form the metering chamber. As a result, an assigned proportionate ejection path is created over the length of the free guide portion, within which the powder pellet is fully guided without any signs of detachment. This can contribute to maintaining the spatial orientation of the powder pellet during and after the ejection operation.

It has certainly proved advantageous not to choose the guide length to be arbitrarily long. Rather, the release portion is expediently longer than the guide length. As a result, a correspondingly gentle release operation is achieved via the comparatively long release length without any significant loss in guiding such that the tendency to tilt is reduced further or even eliminated.

In an embodiment, the pipette edge is realized in a sharp-edged manner. As a result, the uniformity of the extracted mass is more constant. Furthermore, it could be observed that the interactions between the powder pellet and the sleeve opening during ejection are minimized.

The overall achievement is that the behavior of the powder pellet when transferring into the target container is more certain. As the powder pellet falls almost in a straight line, accuracy is clearly improved. Powder loss is minimized, the proportion of correctly filled containers is increased and the yield is improved. Productivity and economic efficiency overall are increased. Less contamination occurs in the machine, which facilitates maintaining GMP guidelines (Good Manufacturing Practice).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
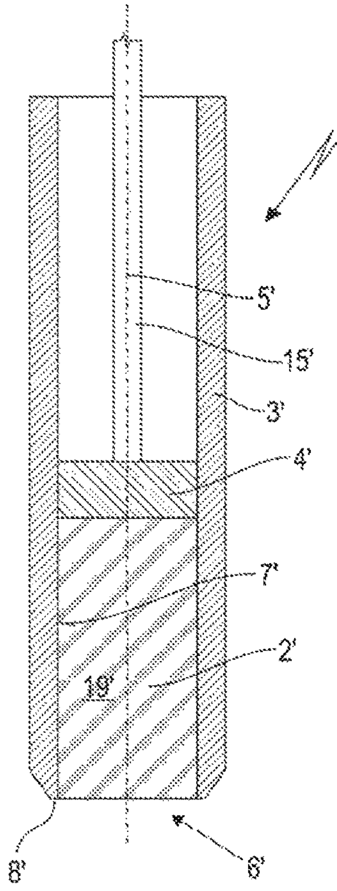
FIG. 1 shows a schematic longitudinal sectional representation of a pipette according to the prior art with a metering piston situated in a retracted metering position.

FIG. 1 shows a schematic longitudinal sectional representation of a pipette 1' according the prior art. The pipette 1' includes a pipette sleeve 3' and a metering piston 4'. The pipette sleeve 3' extends along a longitudinal axis 5' and includes a free end 6'. On its inside, the pipette sleeve 3' includes an inner circumferential wall 7' which extends in a closed manner around the longitudinal axis 5' and extends in the direction of the longitudinal axis 5' up to the free end 6' and ends there in obtuse pipette edge 8' which extends around the longitudinal axis 5' in a closed manner. The metering piston 4' is guided so as to be displaceable parallel to the longitudinal axis 5' inside the pipette sleeve 3', more precisely inside the inner circumferential wall 7, and is positioned or moved axially via a piston rod 15'.

According to FIG. 1, the metering piston 4' is pulled back into the interior of the pipette sleeve 3' relative to the pipette edge 8' and, in this case, has assumed a retracted metering position. The metering piston 4' includes a lower end face 14' which, with the metering piston 4' in the metering position, faces the pipette edge 8', and which, in this connection, together with the inner circumferential wall 7', defines a metering chamber 19'. For metering powder, the pipette 1' has been plunged from above with its pipette edge 8' in front into a powder bed which is not shown. A powder pellet 2', which has been ejected from the named powder bed and lifted out via the pipette 1', is formed in the metering chamber 19'.

Figure 2:
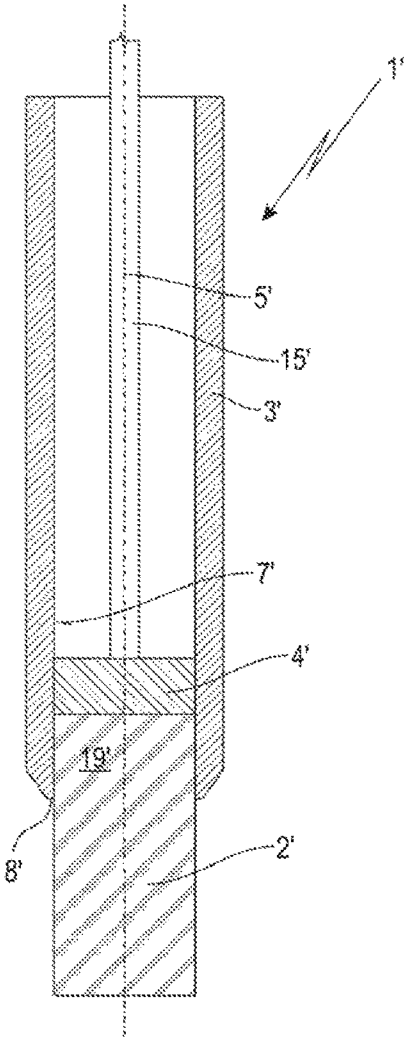
FIG. 2 shows the pipette according to FIG. 1 with the powder pellet partially pushed out.

In this state, the pipette 1' together with the powder pellet 2' situated in the metering chamber 19' is moved to the target site and is ejected there via the metering piston 4', as is shown in the schematic longitudinal sectional representation according to FIG. 2. Compared to the retracted metering position according to FIG. 1, the metering piston 4' is displaced via its piston rod 15' in the direction of the pipette edge 8', the end face 14', however, not yet having reached the pipette edge 8'. The powder pellet 2' is pushed partially out of the pipette sleeve 3. Part of the powder pellet already projects downward over the pipette edge 8', while a further part is still guided by the inner circumferential wall 7'. As a result, the powder pellet 2' is aligned substantially coaxially to the longitudinal axis 5'.

Figure 3:
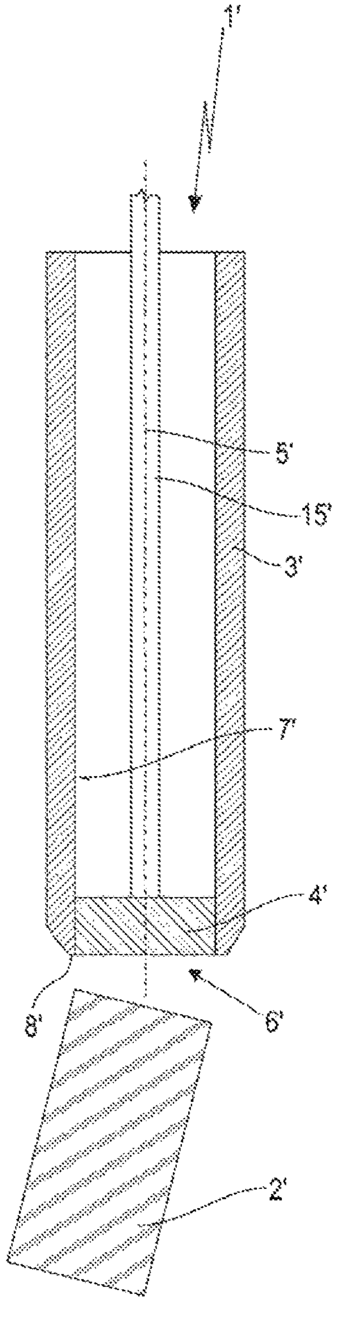
FIG. 3 shows the pipette according to FIGS. 1 and 2 with the metering piston fully extended and the powder pellet falling incorrectly.

Finally, FIG. 3 shows the arrangement according to FIGS. 1 and 2 with the metering piston 4' fully extended, the end face 14' of which has reached the pipette edge 8'. The powder pellet 2' has detached itself from the pipette sleeve 3' and the metering piston 4' and falls into its target container (not shown). In the case of the realization shown here of the pipette 1' according to the prior art, it has been observed that the powder pellet 2' tilts in an uncontrollable manner compared to the coaxial alignment according to FIGS. 1 and 2 and falls into the target container losing the coaxial alignment. This reduces target accuracy during filling into the target containers. In addition, it has been shown that 100% in-process control is not practically workable.

Figure 4:
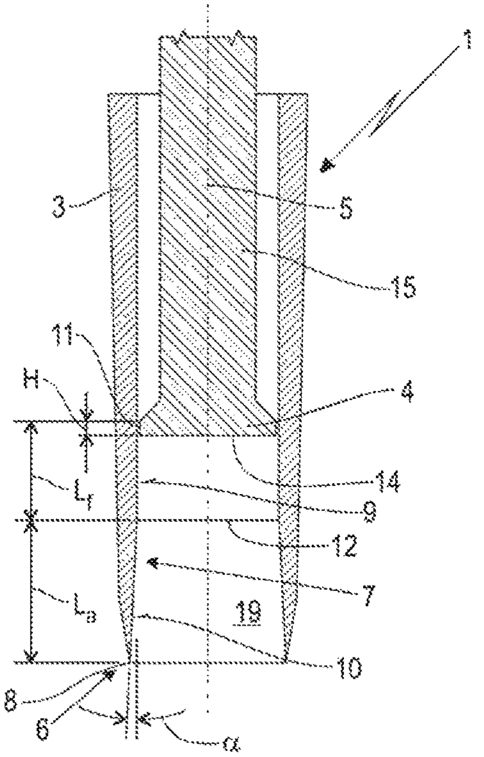
FIG. 4 shows a schematic longitudinal sectional representation of a first embodiment of a pipette, a release portion of the inner circumferential wall widening continuously in a cone-shaped manner.

FIG. 4 shows a schematic longitudinal sectional representation of a first embodiment of a pipette 1 which has been developed further according to the disclosure and, just as the pipette 1' according to the prior art in FIGS. 1 to 3, is provided for metering powder. The pipette 1 is shown here in a vertically upright operating position. It includes a pipette sleeve 3 and a metering piston 4 with an end face 14, the metering piston 4 being situated on the lower end of a piston rod 15 and, in the embodiment shown, is realized in one part with the piston rod. As a whole, the pipette 1, including its pipette sleeve 3, its metering piston 4 and its piston rod 15, extends along an upright, vertically positioned longitudinal axis 5. On its inside, the pipette sleeve 3 includes an inner circumferential wall 7 which extends around the longitudinal axis 5 in a closed manner and extends in the direction of the longitudinal axis 5 up to a lower, free end 6 of the pipette sleeve 3 and ends there in a pipette edge 8 which extends around the longitudinal axis 5. Deviating from the prior art according to FIGS. 1 to 3, the pipette edge 8 is realized in a sharp-edged manner.

The metering piston 4 is guided so as to be displaceable parallel to the longitudinal axis 5 inside the pipette sleeve 3, axial positioning and an axial lifting movement of the metering piston 4 via the piston rod 15 being produced via a lift drive (not shown). Radially on the outside, the metering piston 4 includes a circumferential guide surface 11 which is surrounded by the inner circumferential wall 7 of the pipette sleeve 3.

Analogously to the prior art according to FIG. 1, the metering piston 4 in the representation according to FIG. 4 has been pulled back upward into the pipette sleeve 3 relative to the pipette edge 8 into a retracted metering position. In this connection, the end face 14 of the metering piston 4 together with the inner circumferential wall 7 defines a metering chamber 19 which is open downward at the circumferential pipette edge 8. Between the guide surface 11 and the inner circumferential wall 7 there is a gap or a defined radial clearance in order to promote ventilation of the metering chamber 19 during the plunging operation, that is, when filling with powder.

Deviating from the prior art according to FIGS. 1 to 3, in the region of the metering chamber 19 the inner circumferential wall 7 is divided into a guide portion 9 and into a release portion 10 which adjoins the guide portion 9 at the bottom and extends up to the pipette edge 8. The guide portion 9 therefore extends in the axial direction proceeding from the rear side of the metering piston 4 situated in the retracted metering position, that is, from the upper or rear end of the guide surface 11 to the axial start of the release portion 10, where the guide portion 9 adjoins the release portion 10 along a circumferential boundary 12. The release portion 10, in turn, extends in the axial direction proceeding from the boundary 12 to the circumferential pipette edge 8.

According to FIG. 4, the circumferential guide surface 11 of the metering piston 4 includes an axial height H, while the guide portion 9 of the inner circumferential wall 7 includes a guide length $L_f$ which is measured in the direction of the longitudinal axis 5. In the retracted metering position shown, the metering piston 4 comes to rest at least with part of its circumferential guide surface 11 in the guide portion 9. In this case, it can be possible for the end face 14 already to project into the release portion 10 in the retracted metering position. In the shown embodiment, the guide portion 9 of the circumferential wall 7, however, surrounds the guide surface 11 along its entire axial height H in the retracted metering position. In this case, it can be expedient for the end face 14 to rest at the height of the boundary 12. In this case, the guide length $L_f$ would then be equal to the axial height H. In the shown embodiment, however, the guide length $L_f$ is greater than the axial height H of the guide surface 11 of the metering piston 4 such that, with the metering piston 4 in the retracted metering position, the end face 14 is positioned above the boundary 12. A region of the guide portion 9, which leads downward beyond the end face 14, accordingly directly forms a proportion of the circumferential wall of the metering chamber 19. Over and above this, the release portion 10, which forms the circumferential wall of the metering chamber 19 proportionately, also includes a release length $L_a$ which is measured in the direction of the longitudinal axis 5 of the boundary 12 up to the pipette edge 8 and although not necessary, is maybe preferred, as shown here, to be longer than the guide length $L_f$.

Various cross sections of the interior of the metering sleeve 3 which is surrounded by the inner circumferential wall 7 are determined in planes which lie perpendicularly to the longitudinal axis 5. Along the longitudinal axis 5, the guide portion 9 surrounds a constant cross section which continues on the other side of the metering piston 4 up to the region of the piston rod 15. In other words, the inner circumferential wall 7 in the guide portion 9 and in the region connecting upwardly thereto forms, in the geometric sense, a general cylinder jacket, which is realized here in the specific embodiment as a circular cylinder but can also surround other suitable cross sectional forms. Compared to this, the metering chamber 19 includes greater cross sections which are surrounded by the release portion 10 of the inner circumferential wall 7.

Figure 5:
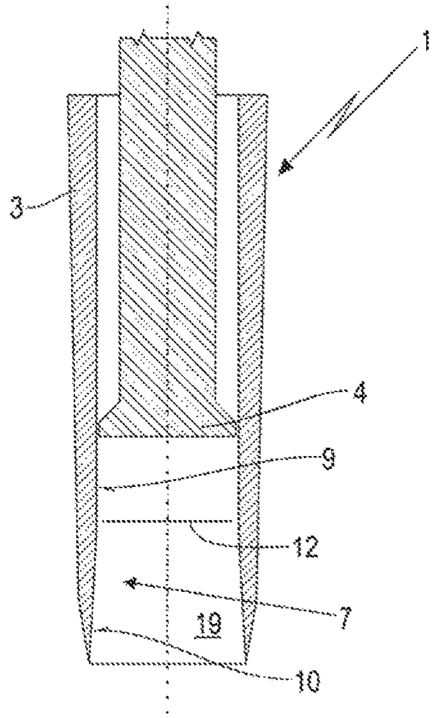
FIG. 5 shows a variant of the pipette according to FIG. 4 with a release portion which widens continuously in a rounded manner.

FIG. 5 shows a schematic longitudinal sectional representation of a variant of the arrangement according to FIG. 4. In both cases, the respective release portions 10 surround the same cross section as the guide portion 9 at the boundary 12, the cross section which is surrounded by the release portion 10 continuously increasing in size proceeding from the boundary 12 along the longitudinal axis 5 up to the pipette edge 8. In the case of the embodiment according to FIG. 5, the release portion 10, when viewed in the longitudinal section of the pipette sleeve 3, extends proceeding from the boundary 12 toward the pipette edge 8 in a convex curvature, the convex curvature merging tangentially, that is, without realizing an edge in the guide portion 9. Deviating from this, the release portion 10 of the inner circumferential wall 7 according to FIG. 4, when viewed in the longitudinal section of the pipette sleeve 3, extends in a linear manner from the boundary 12 toward the pipette edge 8, at a half angle $\alpha$ relative to the longitudinal axis 5. The half angle $\alpha$ is advantageously within a range of between 0.5° to 5.0°, in a preferred manner within a range of between 1.0° and 2.0° and in particular is at least approximately 1.5°. At all events, a circumferential edge is realized along the boundary 12 on account of the named linear progression.

Figure 6:
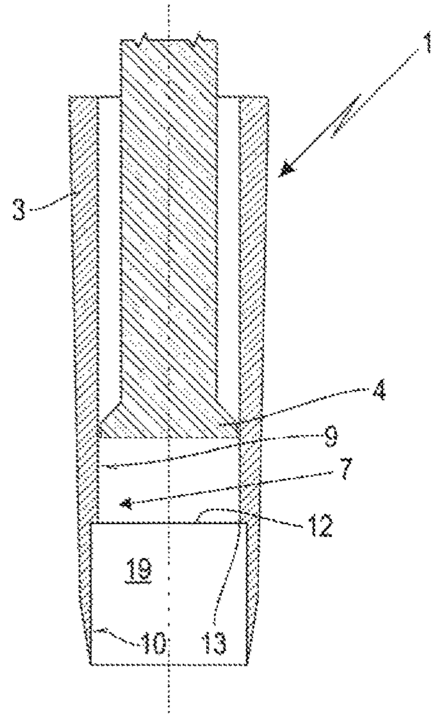
FIG. 6 shows a schematic longitudinal sectional representation of a further embodiment of a pipette, the release portion of the inner circumferential wall being widened in a step-shaped manner in relation to the guide portion.
Figure 7:
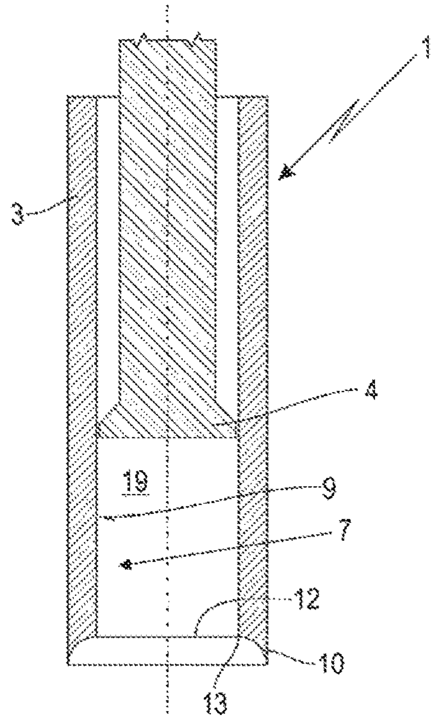
FIG. 7 shows a variant of the pipette according to FIG. 6 with a release portion widened in a step-shaped and concavely rounded manner.
Figure 8:
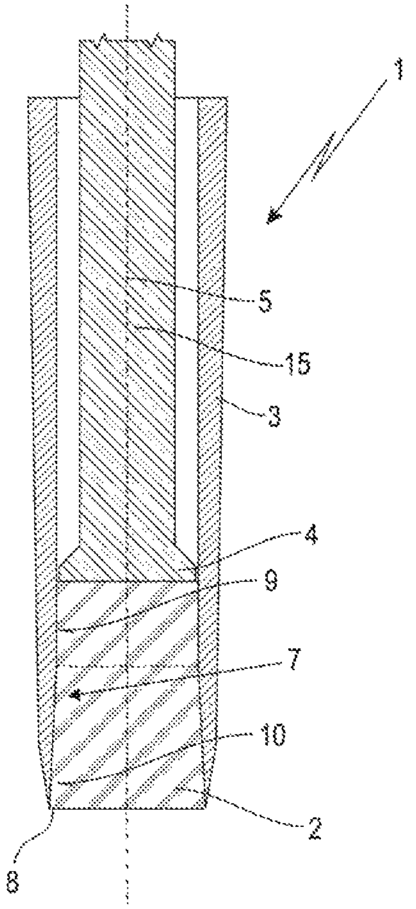
FIG. 8 shows the pipette according to FIG. 4 with a metering piston situated in the retracted metering position thereby realizing a powder pellet.
Figure 9:
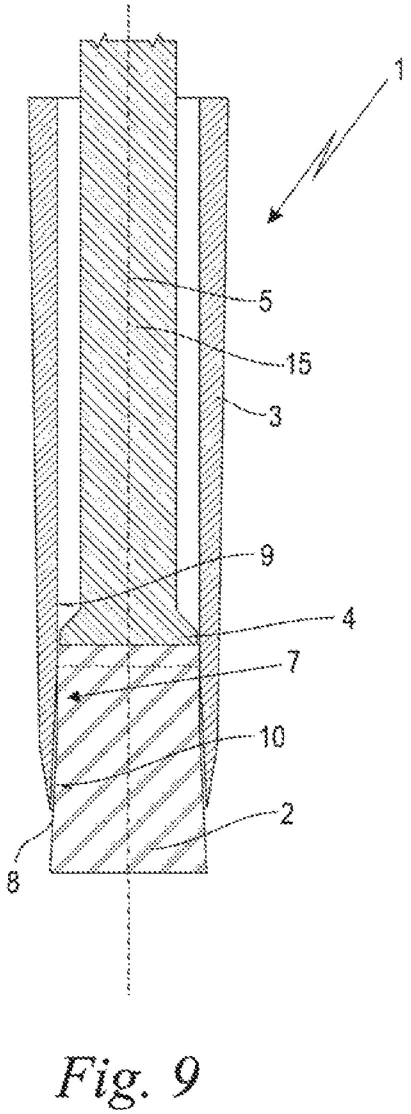
FIG. 9 shows the arrangement according to FIG. 8 with the metering piston extended in part and with the powder pellet ejected to the same extent.
Figure 10:
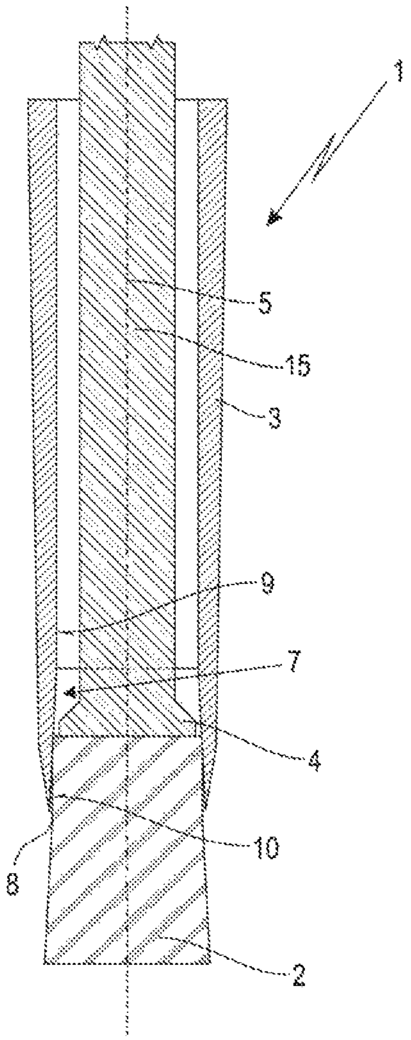
FIG. 10 shows the arrangement according to FIGS. 8 and 9 with the metering piston extended further, but not yet fully, the powder pellet having been detached from the release region of the inner circumferential wall; and, FIG. 11 shows the arrangement according to FIGS. 8 to 10 with the metering piston fully extended, the powder pellet falling straight and tilt-free through a measuring section.

FIGS. 6 and 7 show schematic longitudinal sectional representations of further variants of the embodiments according to FIGS. 4 and 5. Deviating from FIGS. 4 and 5, the cross section which is surrounded by the release portion 10 in the embodiments according to FIGS. 6 and 7 is widened rapidly at the boundary 12 relative to the cross section which is surrounded by the guide portion 9, a circumferential step 13 being realized. In the embodiment according to FIG. 6, the release portion 10 of the inner circumferential wall 7, when viewed in the longitudinal section, extends parallel to the longitudinal axis 5 and therefore, just like the guide portion 9, forms a geometrically general cylinder which is realized here as a circular cylinder with a widened cross section compared to the guide portion 9. In the embodiment according to FIG. 7, the release portion 10, when viewed in the longitudinal section, extends along a concavely curved line. Insofar as nothing to the contrary is mentioned or shown in detail, the remaining features and reference symbols of the embodiments according to FIGS. 4 to 7 match one another.

FIGS. 8 to 11 show the metering and ejecting operation carried out with the pipette according to FIG. 4 as phase images, however, the same being applicable analogously to all the other embodiments including those of FIGS. 5 to 7. According to FIG. 8, the metering piston 4 is pulled back into the retracted metering position according to FIG. 4 via its piston rod 15. Analogously to the prior art according to FIG. 1, the pipette 1 has been plunged beforehand into a powder bed (not shown), having drawn up a part amount of the powder from the powder bed via its pipette edge 8. The metering chamber 19 shown in FIG. 4 has been filled with powder thereby realizing a powder pellet 2, elastic resetting forces in the pressed powder material pressing the powder pellet 2 from the inside against the circumferential wall 7 under radial pre-tension. The powder pellet 2, in this case, has the volume of the metering chamber 19 (FIG. 4).

The powder pellet 2 formed or provided in this manner is then moved via the pipette 1 to the target site, where it is ejected via the metering piston 4. A first phase of the ejection operation is shown in the schematic longitudinal sectional representation according to FIG. 9, the metering piston 4 already being extended a little compared to the metering position according to FIG. 8, however not yet running over the boundary 12. In this case, it can be seen in FIG. 9 that the powder pellet 2 is already partially detached from the inner circumferential wall 7, namely in the region of the release portion 10, while in particular in the guide portion 9 it still abuts against and is guided by the inner circumferential wall 7. The pro-rata release operation of the powder pellet 2 from the inner circumferential wall 7 of the pipette sleeve 3 is continued as the metering piston 4 is fed further toward the pipette edge 8, as is shown in the schematic longitudinal sectional representation according to FIG. 10. The metering piston 4 has already passed the boundary 12 here. Elastic resetting forces of the powder pellet 2 are only sufficient in the radial direction for a small amount of contact between the upper region of the powder pellet 2 and the inner circumferential wall 7. As the feed progresses and as a result the effective cross section of the release portion 10 becomes larger, the contact becomes less and less. The powder pellet 2 consequently gradually becomes fully detached from the pipette sleeve 3 or from the inner circumferential wall 7, continuing to be guided downward initially, however, by the metering piston 4.

Figure 11:
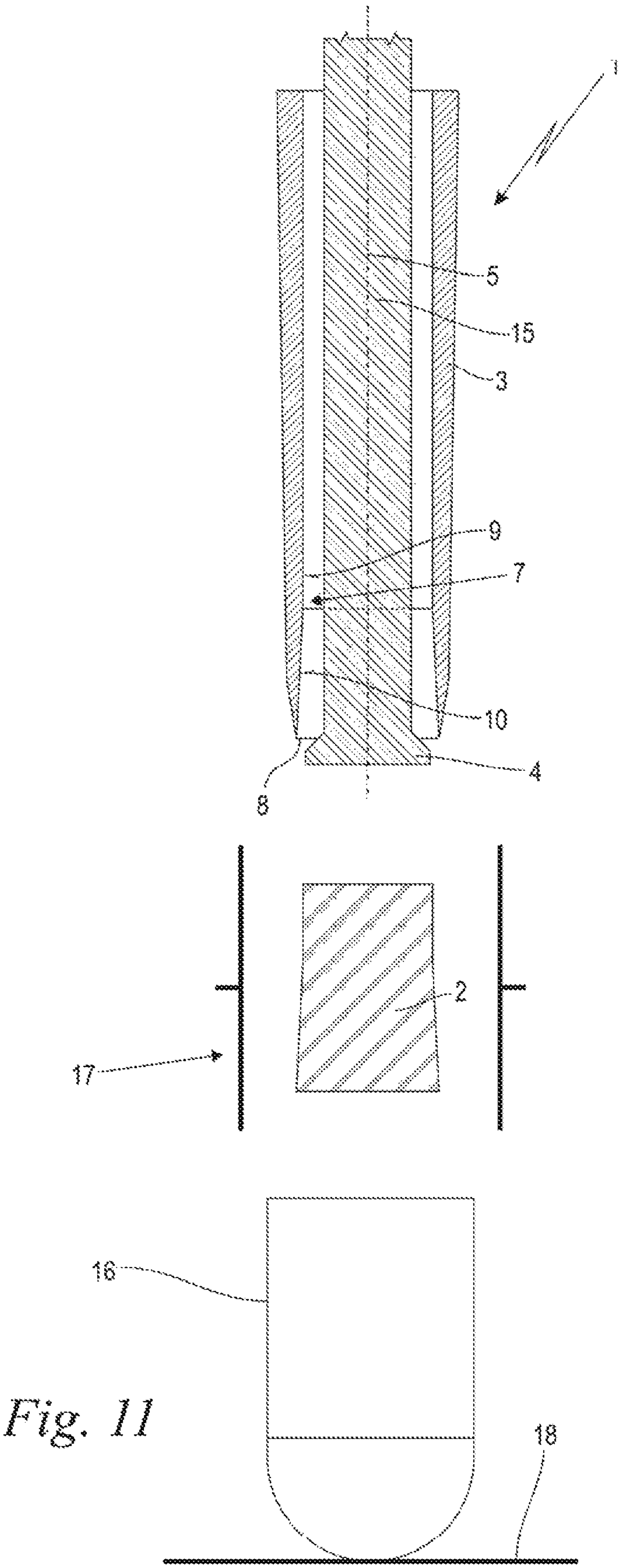

Finally, the metering piston 4, according to the schematic longitudinal sectional representation according to FIG. 11, has reached its lower ejection position, being pushed downward by way of its entire guide surface 11 over the pipette edge 8. A gap has been realized between the guide surface 11 and the pipette edge 8, through which the space between the inner circumferential wall 7, the metering piston 4 and the piston rod 15 is able to be cleaned. Finally, the powder pellet 2 has also detached itself from the metering piston 4 without, in this case, experiencing the tilt fault observed in the prior art according to FIGS. 1 to 3. Rather, the powder pellet 2 now falls downward into the target container positioned there, to which end here, as an example, a capsule bottom part 16 of a two-piece capsule is indicated. When falling, the longitudinal axis of the powder pellet 2 remains substantially coaxial to the longitudinal axis 5 of the pipette 1. This allows for capacitive AMV measuring via a schematically indicated capacitor 17. As a supplement to this or as an alternative to it, schematically indicated scales 18 can also be used for the target container filled with powder pellets 2. At all events, 100% in-process control of the weight of the volumetrically measured powder pellet 2 has been made possible as a result of maintaining the upright axial position of the powder pellet 2.

It is understood that the foregoing description is that of the preferred embodiments of the invention and that various changes and modifications may be made thereto without departing from the spirit and scope of the invention as defined in the appended claims.

What is claimed is:

1. A pipette for metering powder, the pipette comprising:

a pipette sleeve;

a metering piston having an end face for ejecting the powder from said pipette sleeve;

said pipette sleeve extending along a longitudinal axis;

said pipette sleeve including a free end and defining a pipette sleeve inside;

said pipette sleeve, on said pipette sleeve inside, including an inner circumferential wall which extends in a closed manner around the longitudinal axis;

said inner circumferential wall extending in the direction of the longitudinal axis up to said free end of said pipette sleeve and ending there in a pipette edge which extends around the longitudinal axis;

said metering piston being guided so as to be movable parallel to the longitudinal axis inside said inner circumferential wall;

said end face, with said metering piston in a retracted metering position, defining a metering chamber together with said inner circumferential wall;

said metering chamber defining a metering chamber region;

said inner circumferential wall being, in said metering chamber region, divided into a guide portion and into a release portion which adjoins said guide portion and extends up to said pipette edge;

said inner circumferential wall extending parallel to the longitudinal axis in said guide portion; and, wherein said release portion surrounds a cross section of said metering chamber which is radially widened compared to said guide portion.

2. The pipette of claim 1, wherein:

said release portion adjoins said guide portion along a boundary and surrounds the same cross section as said guide portion at the boundary; and, said cross section which is surrounded by said release portion continuously increases in size proceeding from said boundary toward said pipette edge.

3. The pipette of claim 2, wherein, when viewed in longitudinal section of said pipette sleeve, said release portion of said inner circumferential wall extends in a linear manner proceeding from said boundary toward the pipette edge.

4. The pipette of claim 3, wherein, when viewed in longitudinal section of the pipette sleeve, said release portion extends at a half angle (α) relative to the longitudinal axis; and, said half angle (α) lies within a range of 0.5° to 5.0°.

5. The pipette of claim 3, wherein, when viewed in longitudinal section of the pipette sleeve, said release portion extends at a half angle (α) relative to the longitudinal axis; and, said half angle (α) lies within a range of 1.0° to 2.0°.

6. The pipette of claim 2, wherein, when viewed in longitudinal section of the pipette sleeve, said release portion of said inner circumferential wall extends curved in a convex manner proceeding from said boundary toward said pipette edge.

7. The pipette of claim 6, wherein, when viewed in longitudinal section of the pipette sleeve, said release portion of said inner circumferential wall merges tangentially into said guide portion at said boundary.

8. The pipette of claim 1, wherein:

said release portion adjoins said guide portion along a boundary; and, said cross section which is surrounded by said release portion increases in size rapidly at said boundary relative to said cross section which is surrounded by said guide portion thereby realizing a circumferential step.

9. The pipette of claim 1, wherein:

said metering piston includes a guide surface which extends in a circumferential direction and has an axial height (H); and, said guide portion of said inner circumferential wall surrounds said guide surface along its entire axial height (H) when said metering piston is in said retracted position.

10. The pipette of claim 9, wherein:

said guide portion includes a guide length ($L_f$) which is measured in the direction of the longitudinal axis; and, said guide length ($L_f$) is greater than said axial height (H) of said guide surface of said metering piston.

11. The pipette of claim 1, wherein:

said release portion has a release length ($L_a$) which is measured in the direction of the longitudinal axis;

said guide portion has a guide length ($L_f$) which is measured in the direction of the longitudinal axis; and, said release length ($L_a$) is longer than the guide length ($L_f$).

12. The pipette of claim 1, wherein the pipette is realized in a sharp-edged manner.

* * * * *